United States Patent [19]

Nakamura et al.

[11] 4,185,002

[45] Jan. 22, 1980

[54] METHOD FOR MANUFACTURING FOUNDRY SAND CORES AND MOLDS

[75] Inventors: Masayuki Nakamura; Setsuo Sanuki, both of Fujieda, Japan

[73] Assignee: Sumitomo Durez Company, Ltd., Tokyo, Japan

[21] Appl. No.: 627,429

[22] Filed: Oct. 30, 1975

[30] Foreign Application Priority Data

Nov. 1, 1974 [JP] Japan ................................ 49-125509

[51] Int. Cl.² .......................... C08K 5/01; C08K 5/05; C08K 5/07; C08K 5/10
[52] U.S. Cl. ................................... 260/42.54; 164/43; 260/37 EP; 260/38; 260/42.52; 260/39 R; 260/40 R
[58] Field of Search ................ 260/38, DIG. 40, 844, 260/42.54, 42.52; 164/43

[56] References Cited

U.S. PATENT DOCUMENTS

| | | | |
|---|---|---|---|
| 2,628,394 | 2/1953 | Valyi | 260/DIG. 40 |
| 2,790,722 | 4/1957 | Kohl et al. | 260/DIG. 40 |
| 2,902,458 | 9/1959 | Teppema | 260/844 X |
| 3,005,244 | 10/1961 | Erdle et al. | 260/DIG. 40 |
| 3,943,089 | 3/1976 | Harpula et al. | 260/DIG. 40 |

Primary Examiner—Sandra M. Person
Attorney, Agent, or Firm—Peter F. Casella; James F. Mudd

[57] ABSTRACT

A method for manufacturing foundry sand cores and molds, which comprises preforming a foundry sand mixture comprising sand, a vinyl acetate resin and an organic solvent for said resin and optionally a resin selected from the group consisting of aromatic thermoplastic resins and aromatic thermosetting resins, and thereafter removing said solvent from the preformed foundry sand mixture by evaporation.

6 Claims, No Drawings

METHOD FOR MANUFACTURING FOUNDRY SAND CORES AND MOLDS

BACKGROUND OF THE INVENTION

The present invention is directed to a self-cure mold process for preparing foundry sand molds which utilizes vinyl acetate resin as binder for the sand-containing mold or core, bonding by the vinyl acetate resin being achieved by evaporating an organic solvent from the preformed mixture containing the sand and resin, thereby achieving the rapid hardening of the binder.

The materials which have heretofore been used as binders in the manufacture of self-curing cores and molds are broadly divided into inorganic binders such as gypsum, cement and sodium silicate and organic binders such as drying oils and cold setting resins, i.e., resins which chemically cure at about ambient temperature. Gypsum and cement are inexpensive, but have the undesirable characteristic of hardening in the presence of water. Thus, the residual water in the sand employed in sand cores and molds can cause the mold to collapse when the water is liberated by the heat of molten metal being cast in the mold. Furthermore, such inorganic binders are deficient in refractoriness and gas permeability.

It is known to employ sodium silicate, in the carbon dioxide mold process where the preformed mixture of sand and binder are cured with carbon dioxide, in the exothermal self-curing mold process which involves mixing of sodium silicate and a powdered metal such as of aluminum, or in the fluid sand self-curing mold process which uses sodium silicate in conjunction with dicalcium silicate and a foaming agent. All these methods are advantageous in that they are inexpensive to use and permit the molds to cure in a short time. Nevertheless, they suffer serious disadvantages such as inferior surface stability, objectionable hygroscopicity, inferior mold collapsibility after casting molten metal and the virtual impossibility of reusing the sand.

Generally use of an inorganic binder entails the serious disadvantage of providing sand molds which are difficult to break or collapse after casting, so that the removal of the cast product from the mold is impeded to a considerable extent.

For the reasons enumerated above, use of self-curing cores and molds employing organic binders has grown.

The method of preparing foundry sand molds using a drying oil-based binder is based on chemical curing of the binder by air and thus is called "the air-setting mold process." This method provides satisfactory mold collapsibility after casting and provides a fine cast surface. Yet, it is disadvantageous in that the setting or curing operation is of long duration and necessitates a heat treatment. This method is also defective in being dependent on the quality of the particular sand used. Cold-setting resins include the urea-(or phenol)-furfuryl alcohol-formaldehyde copolycondensate resins, resol type phenol-formaldehyde resins (or urea copolycondensate resins) and the like. In the cold setting process the cores and molds are chemically cured at ambient temperature by incorporation of a strongly acidic curing agent for the resin such as paratoluene-sulfonic acid or phosphoric acid. In the cold setting process which utilizes an oil-modified alkyd resin and polyisocyanate in the cold box process, a mixture of phenolic resin with an organic isocyanate is molded or preformed to a required shape and the cores and molds are chemically cured by passing an organic amine vapor through the cores and molds.

The sand cores and molds obtained by these methods have greater strength than those obtained by using inorganic binders. They have an additional advantage in that they set rapidly at ambient temperature and provide satisfactory core and mold collapsibility after casting. On the other hand, they have disadvantages of being expensive, or generating irritating or disagreeable odors (such as of amines, formaldehyde or oil) during core-and mold-curing or casting. These methods are disadvantageous in that the quality of the mold is dependent on the quality of the particular sand used and the pot life and setting time of the sand-binder mixtures are difficult to adjust.

Foundry sand binders individually have characteristics of their own, so that the most suitable binder and molding process must be selected with due consideration given to the size and shape of the sand cores or molds required for casting, or the amount of the product desired to be manufactured, etc. Actually there exists no universal binder.

SUMMARY OF THE INVENTION

This invention relates to a method for the manufacture of a foundry sand core or mold, which comprises mixing sand with vinyl acetate resin alone as a binder composition formed by combining a vinyl acetate resin with one or several resins selected from the group consisting of aromatic thermoplastic resins and thermosetting resins, and a volatile organic solvent for said vinyl acetate resin, preforming the resultant foundry sand mixture into a desired shape and thereafter removing said solvent from the preform by evaporation, for example by passing a gas (such as air) through the preform or allowing the preform to stand under vacuum.

DETAILED DESCRIPTION OF THE INVENTION

The present invention overcomes the disadvantages associated with conventional binders. The improvements achieved by practice of this invention include:

(1) Mold collapsibility after casting is satisfactory.
(2) The price of binder is inexpensive.
(3) Less generation of objectionable odor.
(4) The high mold strength is achieved.
(5) The pot life of the sand-binder-solvent mixture is long and its curing rate is rapid. ("Pot Life" means the length of time from the formation of sand containing mixture up to the time when the mixture is no longer capable of being packed in the core or mold pattern.)
(6) Binding properties are not affected by the quality of the sand in use.
(7) The sand can be recycled.
(8) The equipment required for producing sand cores and molds according to the present process is relatively inexpensive.

The characteristic of this invention is in applying the conditions of an "Air Setting Process" to the molding process so that the resin hardens upon removal of solvent.

To bind the sand in preparing cores or molds according to the invention, a vinyl acetate resin alone or a binder composition comprising the vinyl acetate resin, and one or several resins selected from the group of thermoplastic resins and thermosetting resins which have an aromatic ring, are used together with a volatile organic solvent for the vinyl acetate resin. When the solvent is removed from the sand mixture, the vinyl acetate resin exhibits a high bonding strength to the sand, thus forming a sand mold of high strength. The thermoplastic resin and/or the thermosetting resin having aromatic ring substituents is optionally used as an adjuvant for enhancing the thermal resistivity of the core and mold.

The vinyl acetate resins used in the present invention can be a vinyl acetate homopolymer resin or a copolymer of vinyl acetate monomer and another hydrocarbon monomer having a carbon to carbon double bond copolymerizable with said vinyl acetate monomer and containing 2 to 8 carbon atoms. Typically such vinyl acetate copolymers contain about 20 to 80 weight percent of the vinyl acetate monomer. Typical representative examples of suitable vinyl acetate polymer resins for use in the invention include:

Vinyl acetate hompolymers; vinyl acetate-ethylene copolymers containing about 20 to 50 weight percent vinyl acetate monomer residues; vinyl acetate-methyl acrylate copolymers containing about 20 to 80 weight percent of vinyl acetate monomer residues; vinyl acetate-styrene copolymers containing about 20 to 80 weight percent of vinyl acetate monomer residues.

Preferably a vinyl acetate homopolymer is employed as the vinyl acetate polymer resin.

As for the thermoplastic resins having aromatic ring substituents cumarone-idene resins, petroleum resins, terpene resins, phenolic resins, epoxy resins, xylene resins, polyester resins, etc. are suitable, and particularly desirable are the thermoplastic phenolic resins, i.e., thermoplastic phenol-aldehyde resins such as novolak type phenol-formaldehyde resins, benzylic ether type phenol-formaldehyde resins and the known various modified novolak type phenol-formaldehyde resins, etc.

Examples of aromatic thermosetting resins which can be used include phenolic resins, urea resins, melamine resins, ketone resins, furan resins, etc., and particularly desirable are thermosetting phenolic resins, i.e., thermosetting phenol-aldehyde resins such as resol type-phenol-formaldehyde resins, modified resol type phenol-formaldehyde resins such as urea- and furfuryl alcohol-modified phenol-formaldehyde resins, two-step phenolic resins or novolac phenolic resins containing a small amount of hexamethylenetetramine as curing agent incorporated according to conventional practice. (In accordance with conventional curing methods, a small curing amount of such curing agent is employed, typically about 0.0075% to about 0.45% by weight based on the weight of sand.)

Suitable phenol and aldehyde starting materials for preparing the aforementioned thermoplastic and thermosetting phenolic resins are disclosed in F. M. Kujawa et al, U.S. Pat. No. 3,497,465, the pertinent disclosure of which is incorporated herein by reference. Conveniently the phenol employed is phenol itself and the aldehyde used is formaldehyde.

Organic solvents suitable for the present invention are relatively volatile organic liquids in which vinyl acetate resins are soluble and include alcohols such as methanol, ethanol, propanol, etc., ketones such as acetone, methyl ethyl ketone, diacetone alcohol, etc., esters such as ethyl acetate, butyl acetate, etc., aromatic compounds such as toluene, xylene, etc., and other compounds such as mineral terpentines, solvent naphtha, ligroin, dioxane, furfural, furfuryl alcohol, butyl "Cellosolve", "Cellosolve" acetate, etc., which may be used either singly or as a mixture of several. The aforementioned vinyl acetate resin solvent also serves to dissolve any adjuvant thermoplastic or thermosetting resin component which may be used. The solvent is selected with a view to the ease of solvent removal and the drying property of sand mixture. Generally, methanol, toluene, ethyl acetate, butyl acetate, acetone, etc., and mixtures thereof are inexpensive and most desirable, so a suitable solvent is selected from these, depending on the particular kind of resin in use. In determining the amount of solvent to be added the viscosity of the resin solution which varies with the molecular weight and/or chemical structure of the resin will serve a criterion. As the viscosity affects the resin solution's properties such as its covering of sand particles and the workability of the sand mixture containing the resin solution, it is desirable that the viscosity of the resin solution be below about 10 poises at 25° C. Generally, satisfactory results are obtained employing about 0.2 to about 7.0% by weight of solvent based on the weight of the sand used.

In practicing this invention, the binder composition is added to the foundry sand and thoroughly mixed by conventional agitation means. Sufficient strength is manifested when the amount of the binder added to the foundry sand is within the range of about 0.5 to 3.0% solid resin content based on the weight of the sand. When an adjuvant thermoplastic or thermosetting resin is employed with the vinyl acetate resin in accordance with a preferred embodiment of the invention the amount of the adjuvant resin is present in an amount up to about 2.75% based on the weight of sand with the total resin content remaining in the aforementioned range of about 0.5 to 3.0% by weight based on the weight of the sand. As to the duration of the mixing operation, a short time of mixing will suffice. Prolonged mixing is generally undesirable because it may result in premature evaporation of the solvent. The resultant mixture is fed into the hopper of a shell core machine and preformed with pressure in a metallic pattern. The solvent is removed from the preformed mixture, advantageously at a relatively low temperature of about 20° to about 50° C., by passing an inert gas such as air through the preform under a pressure of 0.2 to 5.0 kg/cm$^2$ or allowing the preform to stand under vacuum. Use of an inert gas other than air produces the same effect, but a satisfactory result is obtained by using air which is inexpensive. The waste gas containing the released solvent can be incinerated or recovered for reuse. Thus, disposal of said waste gas is easy.

In addition, it is desirable in the present invention to incorporate a small amount of a conventional mold release agent in the sand mixture, for example organic plasticizers, silicone resins, fatty acids, oils and fats, etc., in order to improve the mold release of preform from the metallic pattern. Where a moldwash is required, use of an aqueous moldwash is desirable.

In using the cores and molds prepared according to the present invention, little unpleasant or irritating odor is emitted from the core or mold when pouring the metal to be cast. The sand cores and molds show excellent collapsibility subsequent to casting, and the recovered sand can be repeatedly used. The properties of the present sand mixture are not affected by the quality of the foundry sand, and the present sand mixture has a long pot life and cures rapidly.

A promising application of the present invention may be in the following case:

When the "V" process (Vacuum Sealed Molding Process), a process recently developed in Japan, is employed for casting a shaped article with a protruding portion, the sand mold can not be satisfactorily preformed because of insufficient elongation of the film to be vacuum formed. To overcome this drawback, the process of the present invention can be utilized for preforming said protruded portion separately.

The following examples are presented to illustrate and explain more particularly the present invention, but it should be understood that the present invention is not restricted thereby. The percentates indicated in these examples are by weight unless otherwise specified.

EXAMPLE 1

A laboratory whirl mixer was charged with 5 kg of foundry sand, 150 g of vinyl acetate polymer resin (50% methanol solution of Vinylol S, a proprietary 47% methanol solution of vinyl acetate thermoplastic homopolymer, made by Kobunshi Kagaku Co., Ltd.) and 2 g of silicone resin (Toshiba's mold-release agent consisting of 10 g of the proprietary silicone, TS M-620, and 100 g of toluene). The charge was mulled for 40 seconds and the mixture thereafter removed and fed to a shell core machine, and a sand mold was preformed in a metallic pattern (50 mm×50 mm in diameter). Then, ambient temperature air was passed through the preform under 1 kg/cm$^2$ pressure for 30 or 60 seconds. The resulting preform was removed from the metallic pattern and tested for compressive strength. The result was as shown in the Table.

EXAMPLE 2

Forty (40) g of a proprietary cumarone-indene resin (made by Japan Steel Corporation) was dissolved in 10 g of toluene and 30 g of acetone, and 80 g of the same proprietary vinyl acetate polymer described in Example 1 was mixed with the solution. Test pieces were made by using 160 g of the mixed resin solution and 5 kg of foundry sand and following the same procedure described in Example 1 and were then tested for compressive strength. The result was as shown in the Table.

EXAMPLE 3

A reaction vessel provided with an agitator, a reflux condenser and a thermometer was charged with 1,000 g of phenol, 710 g of 37% formalin and 15 g of 15% hydrochloric acid. The charge was allowed to react in refluxed condition for three hours. Unreacted phenol and water were removed from the reaction mixture at 160° C. under vacuum to produce a novolak type phenol-formaldehyde resin. 1,000 g of the novolak type phenol-formaldehyde resin was dissolved in 1,000 g of methanol added thereto. Then, 2,000 g of the vinyl acetate resin of Example 1 was added thereto to produce a resin solution having a resin content of 50%.

Test pieces were produced by using 200 g of said resin solution and 5 kg of foundry sand and following the same procedure of Example 1, and tested for compressive strength. The result was as shown in the Table.

EXAMPLE 4

A reaction vessel provided with an agitator, a reflux condenser and a thermometer was charged with 1,000 g of phenol, 1,120 g of 37% formalin, 140 g of 26% aqueous ammonia, 10 g of aniline and 2 g of sodium hydroxide. The charge was allowed to react under a refluxed condition for 40 minutes thereafter unreacted phenol and water were removed. Then, 200 g of methanol and 50 g of acetone were added thereto. The mixture was further allowed to react at 75° C. for two hours to advance the degree of polycondensation. Thereafter, 500 g of methanol and 100 g of acetone were added thereto and cooled, and the cooled mixture was thoroughly mixed at 40° C. with 2,000 g of the vinyl acetate resin of Example 1 added thereto to produce a resin solution having a resin content of 50%.

Test pieces of a mold were made by using 100 g of said resin solution and 5 kg of foundry sand following the same procedure of Example 1 and were tested for compressive strength. The result was as shown in the Table.

EXAMPLE 5

Test pieces of a mold were made by using 75 g of the same resin solution described in Example 3, 75 g of the same resin solution described in Example 4 and 5 kg of foundry sand, following the same procedure described in Example 1, except with the air pressure held at 3 kg/cm$^2$ and then tested for compressive strength. The result was as shown in the Table.

EXAMPLE 6

A reaction vessel provided with an agitator, a reflux condenser and a thermometer was charged with 300 g of ethyl acetate. Separately, 970 g of vinyl acetate, 30 g of itaconic acid, 3 g of benzoyl peroxide and 200 g of ethyl acetate were mixed and the resultant dissolved mixture was introduced dropwise into the reaction vessel under reflux during three hours and then allowed to react further for three hours. Subsequently, 450 g of butyl acetate and 7 g of dibutyl phthalate were added thereto and cooled to produce a resin solution having a resin content of 50%.

A laboratory whirl mixer was charged with 150 g of said resin solution and 5 kg of foundry sand, and the charge was mulled for 30 minutes and then removed from the mixer, fed to a shell core machine, and preformed in a metallic pattern (50 mm×50 mm in diameter). The metallic pattern was connected to a vacuum pump and held under vacuum for 60 seconds. After restoring the pattern to normal pressure the samples were withdrawn from the pattern and tested for compressive strength. The result was as shown in the Table.

COMPARATIVE EXAMPLE 1

A laboratory whirl mixer was charged with 5 kg of foundry sand, 100 g of linseed oil, 5 g of sodium perborate and 10 g of cobalt naphthenate (cobalt content of 6%) and the charge was mixed for 60 seconds. The resultant mixture was then taken out, fed to a shell core machine and preformed in a metallic pattern (50 mm×50 mm in diameter). Air (3 kg/cm$^2$) was passed through the preform. The preform failed to acquire enough strength to be removed intact from the pattern.

COMPARATIVE EXAMPLE 2

A whirl mixer was charged with 5 kg of foundry sand, 75 g of linseed oil-modified alkyd resin and 3.5 g of a catalyst [cobalt naphthenate (6% cobalt)/dibutyl tin dilaurate=9/1] and the charge was mixed for 60 seconds. Thereafter, 18 g of polyisocyanate (Sumidule 44V-20 made by Sumitomo Bayer Urethane Ltd.) was added thereto and mixed for 40 seconds. The resultant mixture was immediately placed in a wooden pattern (50 mm×50 mm in diameter) and tested for compressive strength at ambient temperature. The result was as shown in the Table.

TEST RESULTS FOR COMPRESSIVE STRENGTH

| Example No. | 1 | 2 | 3 | 4 | 5 | 6 | Comparative Example 1 | Comparative Example 2 |
|---|---|---|---|---|---|---|---|---|
| Amount of resin added (% by weight based on sand) | 1.5 | 1.6 | 2.0 | 1.0 | 1.5 | 1.5 | 2.0 | 1.5 |
| Compressive strength (Kg/cm$^2$) after air treatment given for the indicated lengths of time | | | | | | | | 4.2* after 0.5 hour standing |
| | | | | | | | | 10.9* after 1 hour standing |
| 30 seconds | 14.4 | 10.4 | 13.9 | 7.1 | 10.2 | — | 0 | 25.0* after 3 hour standing |
| 60 seconds | 30.0 | 19.8 | 30.4 | 15.2 | 21.8 | 32.1 | 0 | |
| Compressive strength (Kg/cm$^2$) after 24 hour standing at ambient temperature following removal from pattern (after 60 second air treatment therein | 46.2 | 36.7 | 47.4 | 30.5 | 39.7 | 44.2 | 5.2 | 46.2* after 24 hour standing |

*Values for Comparative Example 2 were those after left standing for the indicated lengths of time, at ambient temperature The test pieces of Examples 1 through 6 and Comparative Example 2 were coated with a Zirconium-based aqueous moldwash and used as cores of a test sand mold and a molten metal at 1400° C. was cast. All the test pieces showed quite satisfactory collapsibility and the cores produced fine cast surfaces. During casting, the odor emitted by the test pieces of Example 1 through 6 was less than that emitted by the test piece of Comparative Example 2.

We claim:

1. A self-cure process for manufacturing a foundry sand mold composition which comprises preforming a mixture containing an organic solvent and thereafter evaporating the solvent from the mixture to harden the resin and form the sand mold composition, said mixture consisting essentially of sand, a resin consisting essentially of a mixture of (1) a polyvinyl acetate resin selected from the group consisting of vinyl acetate homopolymers and copolymers of about 20 to 80 weight percent of vinyl acetate with hydrocarbon monomers of 2 to 8 carbon atoms containing a carbon to carbon double bond copolymerizable with said vinyl acetate, and (2) an adjuvant resin selected from the group consisting of an aromatic thermosetting resin selected from the group consisting of urea resins, melamine resins, ketone and furan resins, and an aromatic thermoplastic resin selected from the group consisting of cumaronediene resins, petroleum resins, terpene resins, epoxy resins, xylene resins, and polyester resins, the amount of resin mixture being about 0.5 to 3 weight percent based on the weight of sand, and an organic solvent for said resin mixture selected from the group consisting of methanol, ethanol, propanol, acetone, methyl ethyl ketone, diacetone alcohol, ethyl acetate, butyl acetate, toluene, xylene, and mixtures thereof, the amount of solvent being about 0.2 to 7 weight percent based on the weight of the sand.

2. The process of claim 1 wherein the adjuvant resin is present in an amount of up to about 2.75 weight percent based on the weight of sand.

3. The process of claim 1 wherein the solvent is evaporated from the preformed mixture under a subatmospheric pressure at a temperature of about 20° to about 50° Centigrade.

4. The process of claim 1 wherein the solvent is evaporated from the preformed mixture by passing a stream of inert gas through the preformed mixture at a pressure of about 0.2 to about 5 kg/cm$^2$ and a temperature of about 20° to about 50° Centigrade.

5. The process of claim 1 wherein the solvent is selected from the group consisting of methanol, toluene, ethyl acetate, butyl acetate and mixtures thereof.

6. The process of claim 1 wherein the adjuvant resin is a cumarone-diene resin.

* * * * *